United States Patent
Ejiri et al.

[11] 4,057,845
[45] Nov. 8, 1977

[54] GROUP CONTROL SYSTEM FOR VISUAL INFORMATION PROCESSING

[75] Inventors: Masakazu Ejiri, Tokorozawa; Seiji Kashioka, Kokubunji; Takafumi Miyatake, Hachioyi; Haruo Yoda, Kodaira; Masayoshi Kameyama, Sagamihara, all of Japan

[73] Assignee: Hitachi, Ltd., Japan

[21] Appl. No.: 674,094

[22] Filed: Apr. 6, 1976

[30] Foreign Application Priority Data

Apr. 9, 1975 Japan .................................. 50-42374

[51] Int. Cl.$^2$ .......................... G06F 3/05; G06K 9/04
[52] U.S. Cl. .............................. 364/200; 340/146.3 H
[58] Field of Search ............... 340/146.3 AC, 146.3 H, 340/172.5; 445/1; 364/200

[56] References Cited

U.S. PATENT DOCUMENTS

| | | | |
|---|---|---|---|
| 3,447,135 | 5/1969 | Calta et al. | 340/172.5 |
| 3,633,169 | 1/1972 | Bickford | 340/172.5 |
| 3,806,871 | 4/1974 | Sheppard | 340/146.3 H |
| 3,898,617 | 8/1975 | Kashioka et al. | 340/146.3 H |
| 3,946,361 | 3/1976 | Cruttwell | 340/146.3 AC |
| 3,962,681 | 6/1976 | Requa | 340/146.3 H |

*Primary Examiner*—Harvey E. Springborn
*Attorney, Agent, or Firm*—Craig & Antonelli

[57] ABSTRACT

A group control system comprises multi-combinations of image pick-up devices and an automatic assembly apparatus controlled by information from the image pick-up devices. A computer responds to demands from the image pick-up devices and the automatic assembly apparatus which independently operate with the computer. A plurality of visual information processing apparatus are provided between the interface of the computer and the image pick-up devices, for processing information therefrom, and a pulse generator is coupled to the image pick-up devices and the visual information processing apparatus, for controlling the operations thereof. The image pick-up devices are grouped into a plurality of groups each of which is coupled to each visual information processing apparatus. The plurality of visual information processing apparatuses are timed by different timing pulses from the pulse generator, whereby processing of the information from a great number of the image pick-up devices is efficiently performed by the computer.

10 Claims, 11 Drawing Figures

GROUP CONTROL SYSTEM FOR VISUAL INFORMATION PROCESSING

BACKGROUND OF THE INVENTION

The present invention relates to a multi-apparatus group control system and, more particularly, to a group control system in which the multi-apparatuses to be controlled are grouped into a plurality of groups, each of which is actuated with a different timing.

There is a well known pattern recognition system, which recognizes the shape, position, number and quality of objects; it is also well known to control various apparatuses such as automatic assembly apparatus and an automatic article supplier in accordance with the information from the pattern recognition system. However, there has not yet been developed a group control system, in which multi-combinations of pattern recognition systems and an automatic assembly apparatus, for instance are controlled by a computer.

SUMMARY OF THE INVENTION

An object of this invention is to provide a group control system for an automatic manufacture system for the assembly of semiconductor elements. In the manufacture of transistors, for instance, conventionally, operators handle assembling machines, i.e., the operator observes the position of a transistor chip through a microscope and a gold wire to be bonded thereto is manually placed at a predetermined position of the transistor chip, and then it is bonded thereon. Recently, however, these manufacturing steps have been performed by fully automatic machines due to the development of pattern recognition systems. More specifically, the image of a transistor chip is enlarged by a microscope, and the image is converted into image signals by an image pick-up device such as a vidicon TV camera. These image signals are processed by a visual information processing apparatus, which will be explained in more detail, and a computer, and the coordinates of the predetermined positions on which the gold wire is bonded, are determined. As a result, a capillary tube, through which the gold wire is supplied, is positioned and then necessary wire-bonding is carried out.

Now, a great number of these automatic machines are utilized in the actual transistor manufacture and controlled by the computer. In this case, the greatest problem is how to prevent interruption rush (which means that a lot of requirements occur during a limited time) by the respective automatic machines of the computer.

Another object of this invention is to provide a group control system in which the waiting time for activating computer processing by interruption signals sent from the above respective automatic machines is minimized so that the computer can efficently serve the requirement thereof.

A further object of this invention is to provide a group control system for processing information from a plurality of image pick-up devices applied to an elevator control system. More specifically, in the elevator control system, a plurality of image pick-up devices are installed on walls or ceilings of individual floors and recognize congestion or population of people thereon, whereby a determination can be made as to which elevator is to be operated and which floor the elevator is to serve. The congestion or the population of the people on the individual floors can be detected by a pattern recognition system having a large number of the image pick-up devices. However, where the processing of the information from the above respective image pick-up devices is performed by a computer, there is the problem how to prevent a interruption rush by the image pick-up devices as in the case of the above transistors. Therefore, it is necessary that the computer can sufficently operate without a interruption rush and the people who use the elevators have a waiting time as short as possible.

In order to achieve the above objects, the group control system of the present invention includes a plurality of image pick-up devices, a plurality of visual image processing apparatus and a computer. The plurality of image pick-up devices are grouped into a number of groups equivalent to the number of the visual image processing apparatus, each of which is controlled with a different timing signal, and the computer is coupled with the grouped image pick-up devices through respective visual image processing apparatus, whereby the computer can respond to the requirements from the respective image pick-up devices. The group control system of this invention is applicable not only to automatic manufacturing machines and an elevator control system, but is also applicable to an automatic controlled traffic system, etc.

DETAILED DESCRIPTION

Figure 1:
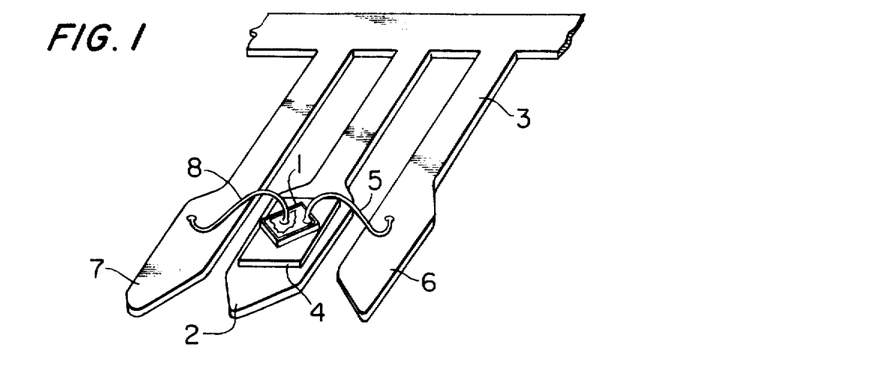
FIG. 1 is a perspective view of a transistor chip mounted on a lead frame.

For better understanding of the invention, an assembly process for a transistor chip mounted on a lead frame will be first explained. Referring to FIG. 1, a transistor chip 1 is bonded on a collector post 2 of a lead frame 3 by a pressure bonding through a gold plate 4. Thereafter, the position of the transistor chip 1 is detected by a pattern recognition system, and an automatic assembly apparatus is positioned on the base electrode of the transistor chip 1 in order to bond a gold wire 5 thereon and, then, the gold wire 5 is bonded by thermal pressure bonding. In the same manner, the automatic assembly apparatus, in turn, is positioned on a base post 6, the emitter electrode of the transistor chip 1 and an emitter post 7 and, at each point, the gold wire is bonded by thermal pressure bonding thereon. Accordingly, the base electrode and the base post 6 and the emitter electrode and the emitter post 7 are connected by gold wires 5 and 8, respectively.

Figure 2:
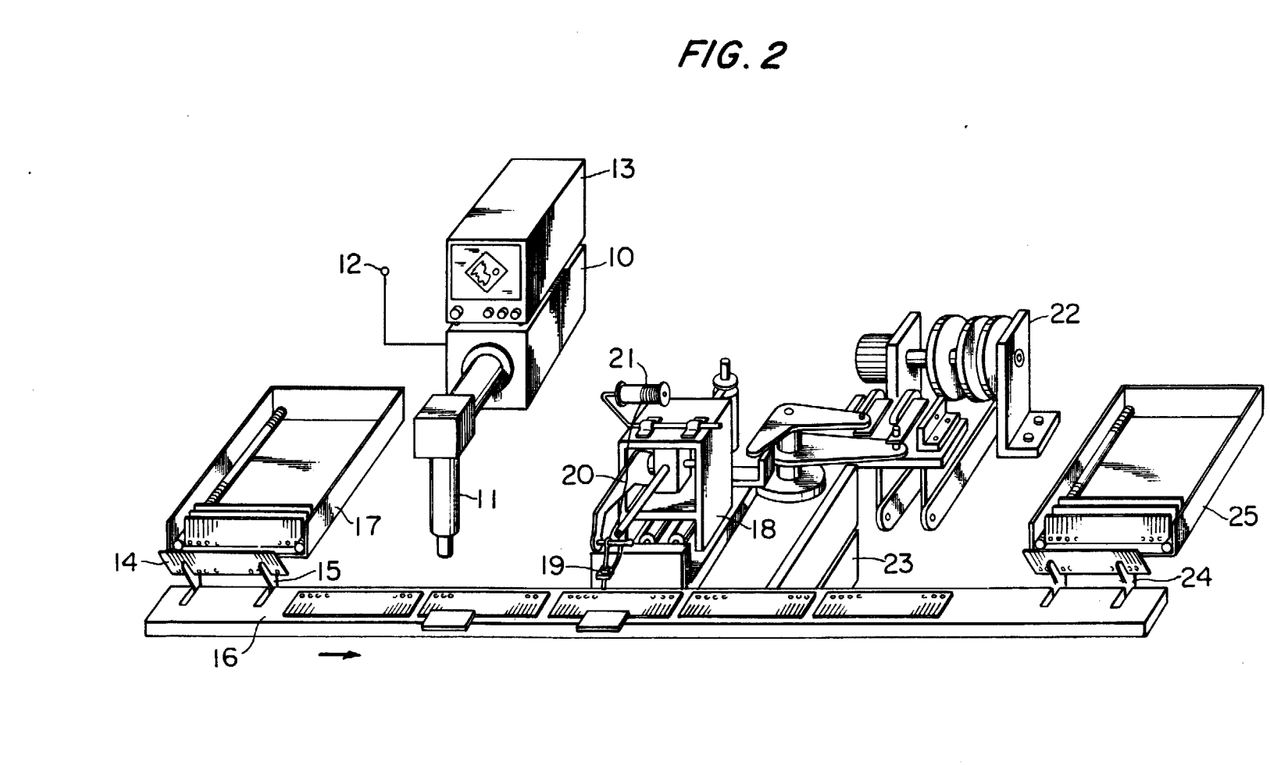
FIG. 2 is a perspective view of an automatic assembly apparatus having a TV camera.

The above assembly process is carried out by an automatic assembly machine having a TV camera, as shown in FIG. 2. In FIG. 2, a TV camera 10 picks up an image of a transistor chip through a microscope 11 and its output is supplied to a visual information processing apparatus, which will be explained hereinafter, through a terminal 12. A TV monitor 13 checks the image of the transistor chip. A lead frame 4 on which a plurality of the transistor chips, for instance, 25 transistor chip, are mounted, is supplied by an arm 15 to a conveyor 16 from a magazine 17 in which the lead frames with the transistor chips are stored, and is intermittently carried from left to right. When the transistor chip to be wire-bonded appears within the field of view of the TV camera 10, an image signal thereof is supplied to the visual information processing apparatus coupled with a computer, in which the positions to be wired on the transistor chip are detected. A bonding machine 18 is positioned in response to the position signal from the computer, when the transistor chip is carried by the conveyor 16 and is placed at the position of the bonding machine 18. More specifically, the bonding machine 18 has a capillary tube 19, through which a gold wire 20 is supplied from a spool 21. The capillary tube 19 presses the gold wire against the positions to be wire-bonded on the transistor chip and bonds the gold wire thereon. The bonding machine 18 is positioned by a cam mechanism 22 and an X-Y servo-mechanism 23 which is controlled by position information from the computer. The lead frame which has been wired is retrieved by an arm 24 and stored in magazine 25. The above is one example of an automatic assembly apparatus with a TV camera, but actually, each manufacture line has several automatic assembly apparatus with a TV camera and there are many of these manufacture lines in a factory.

Figure 3:
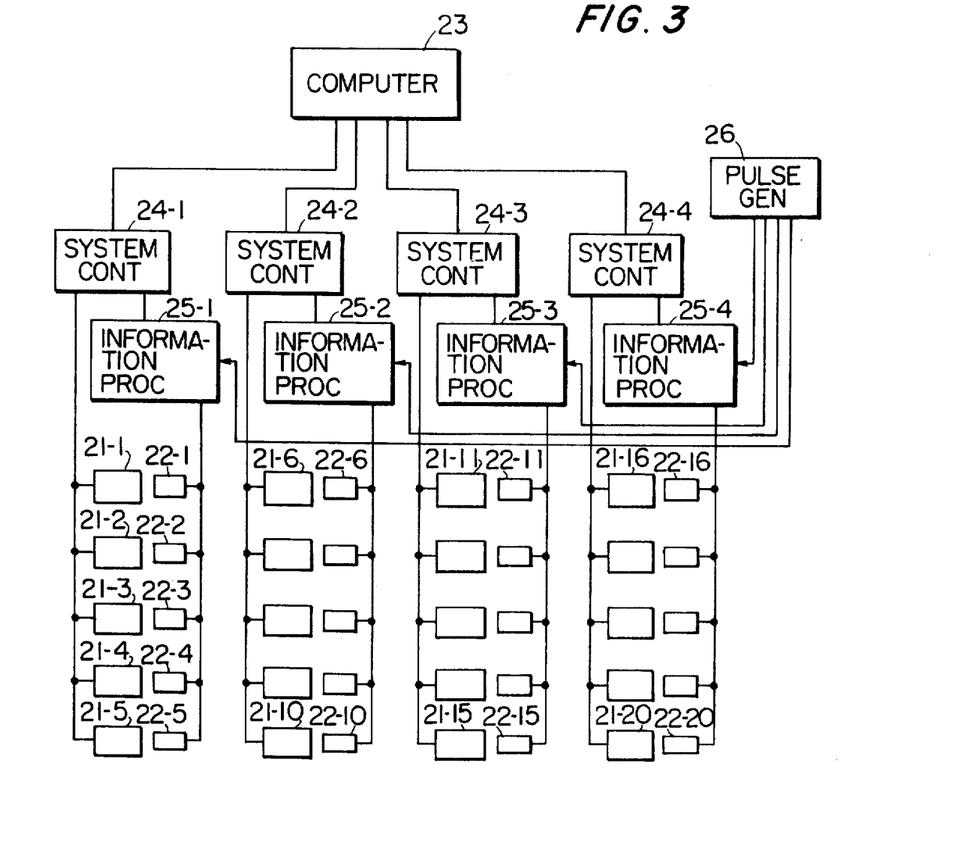
FIG. 3 is a schematic block diagram of an embodiment of this invention.

FIG. 3 shows an embodiment of a group control system of the present invention as applied to these manufacture lines. As shown in FIG. 3, a plurality of automatic assembly apparatus 21-1 through 21-20 are arranged in the manufacture lines and image pick-up devices 22-1 through 22-20 corresponding thereto as well. They are grouped in four groups. The automatic assembly apparatus of the respective groups are coupled to a computer 23 through respective controllers 24-1 to 24-4. The image pick-up devices of the respective groups are coupled to respective visual information processing apparatus 25-1 through 25-4 which are coupled to the computer 23 through the respective system controllers 24-1 through 24-4, the respective visual information processing apparatus being coupled to a pulse generator 26 and operated with different timings.

The above embodiment of the invention has four groups, each of which has five assembly apparatus and five image pick-up devices, but the invention is not limited to such an arrangement and, in general, in the plurality of groups, each may have any plural number of assembly apparatus and image pick-up devices.

Figure 4:
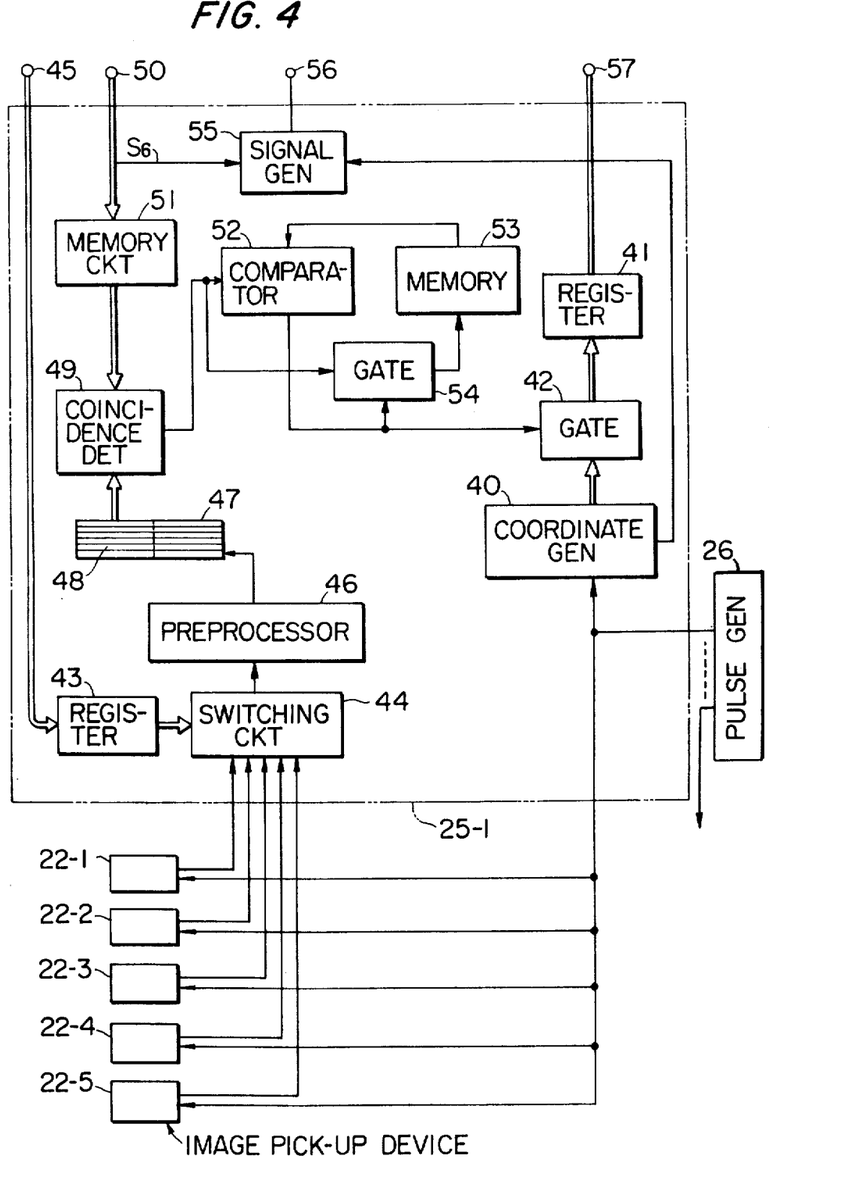
FIGS. 4, 5 and 8 are detailed block diagrams of the portions of the embodiment shown in FIG. 3.

Now, an embodiment of this invention will be explained here in more detail in connection with FIG. 4, which shows an embodiment of a visual information processing apparatus 25-1 shown in FIG. 3. Although only the visual information processing apparatus 25-1 of the first group is illustrated in FIG. 4, it is applicable to the other groups and the difference is that the timings of the timing pulses from the pulse generator 26 are different from each other. Therefore, a detailed description of other visual information processing apparatus 25-2 through 25-4 is unncessary for an understanding of the invention and is omitted.

Referring to FIG. 4, the outputs of the pulse generator 26 are supplied to actuate respective image pick-up devices 22-1 through 22-5 and, at the same time, to a coordinate generator 40.

The detailed construction of the pulse generator 26 will be explained here in connection with FIG. 5. An oscillator 30 produces clock pulses at a frequency of 6 MHz, for instance, which are supplied to a terminal 31 and a counter 32. The counter 32 counts the clock pulses from the oscillator 30, and delivers an output pulse from a terminal 33 for every 382 clock pulses, for instance, and is then reset. The output pulses of the counter 32 are further supplied to a counter 34, the output of which is supplied to a decoder 35. The decoder 35 has four output terminals 36 through 39, from which signals $S_1$ through $S_4$ shown in FIG. 6 are supplied. The signals $S_1$ through $S_4$ are respectively supplied from the decoder 35 at the time that the counter 34 counts 65, 131, 196 and 262 output pulses from the counter 32. The counter 34 is reset by the output signal $S_4$ from the decoder 35. As a result, a horizontal synchronizing signal for TV cameras is obtained from the terminal 33 and vertical synchronizing signals are obtained from the terminals 36 through 39, where the vertical synchronizing signals are shifted by $\frac{1}{4} \times T$ (T: one frame period) from each other. In this case, the output pulses of the terminal 31 are the clock pulses for sampling one frame of the image pick-up device into 382 × 262 pieces of picture elements. Accordingly, the outputs of the terminals 31 and 33 are supplied to the respective groups in FIG. 3; e. g., in FIG. 4, the output of the terminal 31 is supplied to the coordinate generator 40 and the output of the terminal 33 is supplied to the image pick-up devices 22-1 through 22-5 as the horizontal synchronizing pulses, for instance. The outputs of the terminals 36 through 39 are supplied to the groups, respectively for example, in FIG. 4, the output of the terminal 36 is supplied to the image pick-up devices 22-1 through 22-5 as vertical synchronizing pulses. In the above generator, the decoder 35 supplies four output signals since the embodiment of the invention in FIG. 3 has four groups; yet, in general, the decoder 35 can be so designed that it can supply a plurality of output signals equivalent to a number of groups.

Figure 5:
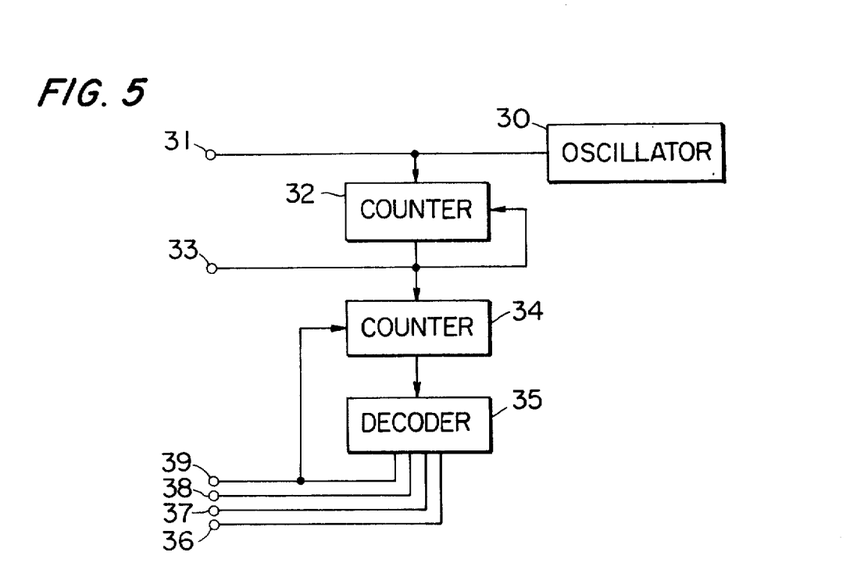
Figure 6:
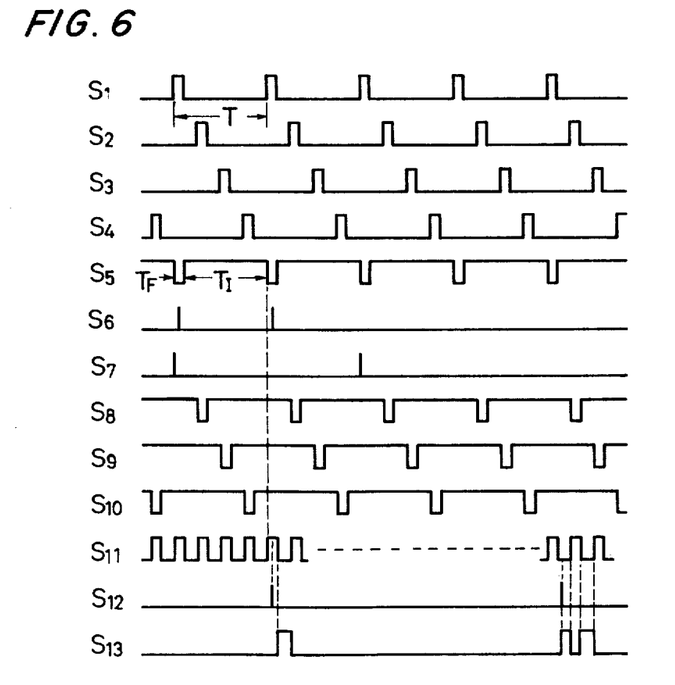
FIG. 6 is a timing diagram for explaining an embodiment of the invention.

Now, referring again to FIG. 4, the coordinate generator 40, to which the clock pulses from the pulse generator 26 are supplied, comprises two counters (not shown), one of which counts the clock pulses and is reset by a horizontal synchronizing signal which may be supplied from the terminal 33 in FIG. 5, the other of which counts the horizontal synchronizing signal and is reset by a vertical synchronizing signal which may be supplied from the terminal 36 in FIG. 5. These counters supply digital signals to a register 41 through a gate 42, the digital signals representing X and Y coordinate positions corresponding to the scanning positions of the image pick-up device 22-1 through 22-5. The detailed configurations of the coordinate generator 40, the register 41 and the gate 42 are described in FIGS. 4 and 6 of U.S. Pat. No. 3,898,617.

On the other hand, the respective image signals of the image pick-up devices 22-1 through 22-5 are supplied to a switching circuit 44 which is controlled by a register 43, to which switching signals are supplied from a computer through a terminal 45 in order to select one of the image signals of the image pick-up devices 22-1 through 22-5. The order of the selection of the image signals may be from the image pick-up devices 22-1 to 22-5 or may be random in response to the requirements from the automatic assembly apparatus. This manner is well known in the computer control field.

The selected image signal is supplied to a memory circuit 47 through a pre-processor 46, in which the image signal is sampled by the clock pulse of 6 MHz in order to convert it into 382 × 262 pieces of picture elements, for instance, and the levels of brightness of the respective picture elements are converted into binary values. The memory circuit 47 comprises a plurality of shift registers which are arranged in the form of lines. In FIG. 4, five lines are shown as one example. Each line comprises 382 shift register storage bit positions, to the first bit position of which the binary signals from the pre-processor 46 are supplied and they are shifted from one bit position to the next. The output of the last bit position of the first line is supplied to the first bit position of the second line and, in general, the output of the last bit position of the preceding line is supplied to the first bit position of the next line. Accordingly, the binary signals of the picture elements, in turn, are shifted in the shift register of the memory circuit 47 synchronized with the scanning of the image pick-up devices. The memory circuit 47 is utilized to extract a partial image pattern from the image pattern picked up by the image pick-up device. For this purpose, a part of the shift registers of the memory circuit 47, for instance, 5 × 5 pieces of the shift register in the form of a square, is utilized, a part of the shift registers being indicated by a reference numeral 48. The respective outputs of the shift registers 48 included in a part of the shift registers of the memory circuit 47 are delivered in parallel and, supplied to a coincidence detector 49. Therefore, the respective outputs of the shift registers 48 comprise the partial image pattern extracted from the entire image pattern, and when the image pick-up device scans the entire image pattern, the partial image pattern in the shift registers changes dynamically and every partial image pattern is supplied therefrom for each sampling interval.

Figures 7, 8:
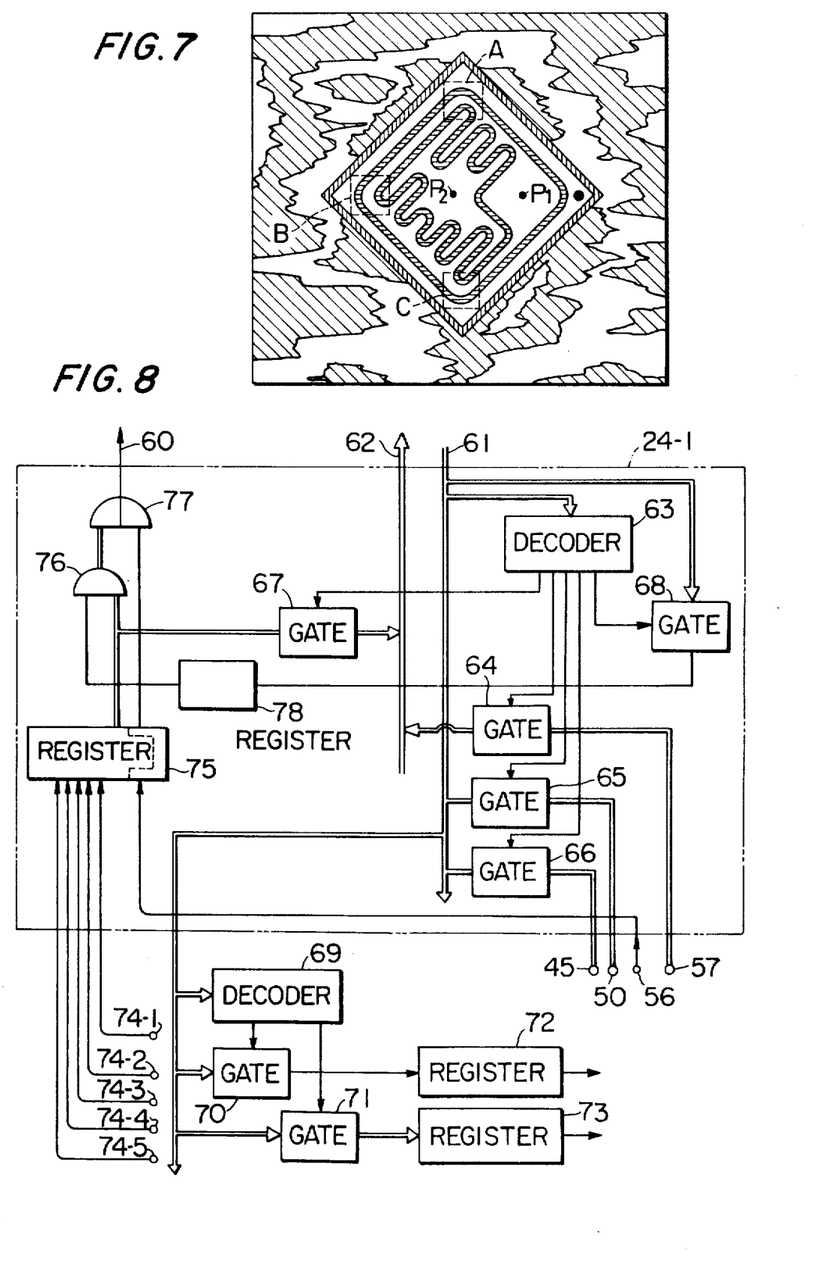
FIG. 7 is a diagram of an image pattern for explaining a principle of pattern recognition.

On the other hand, signals representative of a standard pattern are supplied to a memory circuit 51 from a computer through a terminal 50 and stored therein. The reference or standard pattern is similar to a surface pattern of the characteristic portion of the transistor chip, for example, standard patterns A, B or C as shown in FIG. 7, and is utilized to detect the positions of the transistor chip to be wire-bonded. The outputs of the memory circuit 51 and of the shift registers 48 are supplied to the coincidence detector 49, and the partial image pattern and the standard pattern are compared therein. The degree of coincidence of the partial images pattern and the standard pattern is detected in the form of the sum of the degrees of coincidence between each corresponding picture elements thereof.

At the beginning of a frame, the output of the coincidence detector 49 is compared in a comparator 52 with coincidence information corresponding to the degree of coincidence previously set in a coincidence value hold circuit or coincidence value memory circuit 53. If the present degree of coincidence is better than the contents previously stored in the coincidence value memory circuit 53, the comparator 52 provides an output which opens a gate circuit 54, feeds the present degree of coincidence to the coincidence value memory circuit 53, and renews the contents thereof. The output of the comparator 52 is further fed to the gate circuit 42 in order to supply to the register 41 the output of the coordinate generator 40 at that time, namely, the X- and Y- coordinate values corresponding to the position of the scanning of the image pick-up device, and to renew previously stored coordinate values therein.

Thus, at the time of the termination of the frame at which the scanning is completed, the coordinate position X, Y in the image pattern at which the partial pattern has the highest degree of coincidence with the standard pattern is stored in the register 41, and information representative of the degree of coincidence at that time is stored in the coincidence value memory circuit 53. A more detailed description of the elements designated by the reference numerals 46 through 54 is contained in U.S. Pat. No. 3,898,617.

Referring now to FIG. 6, wave form $S_5$ represents an effective frame period $T_I$ and a fly-back period $T_H$ of the first group in FIG. 3. The standard pattern from the terminal 50 is set in the memory circuit 51 during the fly-back period $T_H$ and then a start signal $S_6$ from the computer through the terminal 50 is fed to a signal generator 55 such as a flip-flop circuit and sets it. Accordingly, the visual image processing apparatus 25-1 is occupied for the image processing as has been described above relating to one of the image pick-up devices 22-1 through 22-5 during the frame period $T_I$ after this fly-back period $T_H$. Next, at the time of the termination of the frame period $T_I$, the vertical synchronizing signal $S_1$ is supplied to the signal generator 55 and the signal generator 55 is reset, so that a computer coupled to a terminal 56 detects the termination of the frame period $T_I$ by a signal $S_7$ appearing on the terminal 56, and reads out the contents of the register 41 from a terminal 57.

The visual image processing apparatus 25-1 will be explained in more detail in connection with FIGS. 6 and 7. FIG. 7 shows an image pattern which is converted an image of a transistor chip picked up by the image pick-up device into binary signals. Reference symbols A, B and C represent standard patterns corresponding to the geometrically characteristic portions of the transistor chip. The number of picture elements of each standard pattern is equivalent to a number of the registers 48 and the number of registers in the memory circuit 51.

First, the standard pattern A is set by the signal $S_6$ in the memory circuit 51 during the fly-back period $T_H$ and then, the X- and Y- coordinate values of the characteristic portion of the transistor chip are detected as explained hereinbefore in the frame period $T_I$ coming after the fly-back period $T_H$ the portion of the transistor having the highest degree of coincidence with the standard pattern A. The computer reads out from the register 41 the X- and Y- coordinate values of the portion of the transistor chip by the signal $S_7$ at the termination of this frame.

Next, the standard patterns B is set by the signal $S_6$ in the memory circuit 51 at the next fly-back period and then, in the same manner as described above, the X- and Y- coordinate values, which are of the portion of the transistor chip having the highest degree of coincidence with the standard pattern B, are detected in the next frame period, and are supplied to the computer.

From the X- and Y-coordinate values corresponding to the standard patterns A and B, the computer calculates the distance and the relative angle therebetween. If the calculated results are similar to predetermined distance and angle depending upon an electrode pattern of the transistor chip, it can be recognized that these X- and Y-coordinate values are correct. Therefore, bonding positions, for instance, $P_1$ and $P_2$ shown in FIG. 7 are calculated by use of data corresponding to relative positions stored in the computer. If the calculated results are not similar to them, it can be recognized that either one of the portions of the transistor chip corresponding to the standard patterns A and B is defective. Therefore, the standard pattern C is set by the signal $S_6$ in the memory circuit 51 at the next fly-back period and the X- and Y- coordinate values of the portion of the transistor chip having the highest degree of coincidence with the standard pattern C are detected as well. Then, in the respective combinations between the X- and Y- coordinate values as to the standard pattern C and the X- and Y- coordinate values as to the standard patterns A and B, the distances and relative angles therebetween are respectively calculated as described above, and a suitable combination is selected therefrom. Accordingly, the bonding positions $P_1$ and $P_2$ of the transistor chip are calculated from this combination. The above detection of the bonding positions $P_1$ and $P_2$, for instance, is completely done during the flyback period of the image pick-up device. The above-described pattern recognition is set forth in U.S. Pat. No. 3,898,617, in more detail.

Now, the system controller 24-1 in FIg. 3 will be described in more detail in connection with FIG. 8. In FIG. 8, terminals 45, 50, 56 and 57 correspond to the terminals 45, 50 56 and 57 of the visual image information apparatus 25-1 in FIG. 4, respectively. Reference numerals 60, 61 and 62 designate an interruption line, a digital output bus and a digital input bus coupled with the computer 23 in FIG. 3. The computer can be a HITACHI HIDIC-150, for instance, the construction of which is described in System Manuals 150-1-001 and 150-2-001. The data from the computer, the visual information apparatus and the automatic assembly apparatus are transmitted through the digital output bus 61 and the digital input bus 62. Information from the digital output bus 61 is read by a decoder 63, the outputs of which control gates 64 to 68, and control information is supplied to respective portions of a system. Further, the information from the computer through the digital output bus 61 also includes control information for the respective automatic assembly apparatus 21-1 through 21-5. The control information on the bus 61 is applied to a decoder 69 arranged in each automatic assembly apparatus, by which necessary data and instructions for this automatic assembly apparatus are read out, so that the decoder 69 controls gates 70 and 71, through which the data and instructions are stored in a data register 72 and an instruction register 73. A detailed description of these processing steps will be omitted since they are well known for the usual computer control system.

Now, when the transistor chip is supplied within the field of view of a certain image pick-up device, e. g. the image pick-up device 22-1, an interruption signal requesting a pattern position recognition is applied to an interruption terminal 74-1 and a "1" is set in a register 75 corresponding thereto. Other terminals 74-2 through 74-5 are provided for other image pick-up devices 22-2 through 22-5, respectively. The interruption signal may be produced by a switch in response to the operation of the conveyor. The output of the register 75 is supplied to an AND gate 76 and the gate 67, but when the visual information processing apparatus 25-1 is busy or the computer operates in response to the interruption from either one of the visual information processing apparatus 25-2 through 25-4, the output of the register 75 is not delivered to the computer, and is maintained until the processing of the computer is completed. The waiting time for the processing of the computer causes no problem since the conveyor moves intermittently with a period of the order of one second corresponding to several tens of frames, each of which has a period of 16.7 ms, and the plural processings are performed in the computer during that period.

On the other hand, the interruption signal from the terminal 56 is supplied to the register 75, the output of which is preferentially supplied to the computer through an OR gate 77, so that the instructions from the computer are supplied to the decoder 63, the output of which opens the gate 64. Accordingly, the contents of the register 41 which are the X- and Y- coordinate values are read out by the computer through the gate 64 and then the positions $P_1$ and $P_2$ are detected. The AND gate 76 is controlled by a register 78, to which the output of the gate 68 is supplied. More specifically, a "0" is set in register 78 through the gate 68 when the visual information processing apparatus 25-1 begins operating, whereas a "1" is set in the register 78 through the gate 68 when all the processings of the computer are terminated.

Now, when a "1" is set in the register 78, the interruption signal which was previously stored in the register 75 from the terminal 74-1 is supplied to the computer through the AND gate 76 and the OR gate 77, whereby the computer supplies instructions to the decoder 63, in order to open the gate 67 and to read the contents of each register 75 through the input bus 62. As a result, the computer can detect from the contents of the register 75 which automatic assembly apparatus has produced the interruption signal.

In this case, the computer supplies instructions to the decoder 63, by the outputs of which the gates 65 and 66 are opened, so that the contents of the stages of the register 63 in FIG. 4 are such that the image signal of the image pick-up device 22-1 corresponding to the assembly apparatus 21-1 is supplied to the pre-processor 46 through the switching circuit 44, and the standard pattern A, for instance, corresponding to the type of the transistor chip which is manufactured by the automatic assembly apparatus 21-1 is stored in the memory circuit 51 and at the same time, the signal generator 55 in FIG. 4 is activated. Then, the X- and Y- coordinate values of the characteristic portion of the transistor chip which agrees with the standard pattern A are detected in one frame period as described above, and with respect to the standard patterns B and C, the same processes are carried out. The respective X- and Y- coordinate values as to the standard patterns A, B and C are preferentially supplied to the computer during the respective fly-back period in accordance with the interruption signals as described above.

Figure 9:
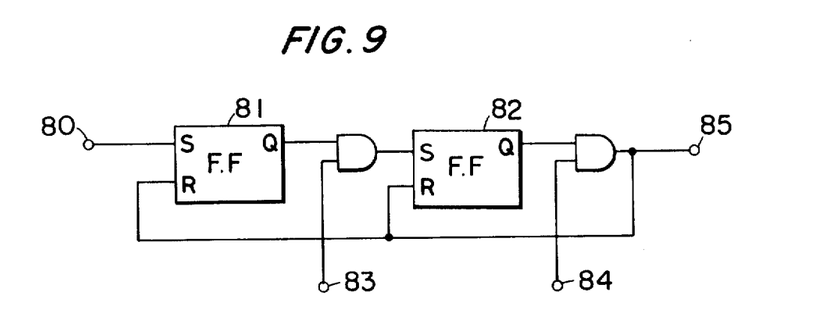
FIG. 9 is a circuit diagram of portions of an embodiment of this invention.

When a recognition initiation signal is produced at the middle of one frame period, the processing is not performed in this frame and is carried out in next complete frame. For this purpose, the signal generator 55 may be composed of the components shown in FIG. 9, in which the start signal from the terminal 50 is supplied to a terminal 80, by which a flip-flop 81 is set. A flip-flop 82 is set by the output of the flip-flop 81 and a pulse corresponding to the trailing edge of the vertical synchronizing pulse which is applied to a terminal 83. A pulse corresponding to the leading edge of the vertical synchronizing pulse is applied to a terminal 84, so that the interruption signal is obtained from a terminal 85.

Then, the positions $P_1$ and $P_2$ of the transistor chip are detected and stored in the computer. When the transistor chip comes up at the position of the assembly apparatus, the interruption signal is applied to the terminal 74-1 whereby the coordinate values of the positions $P_1$ and $P_2$ and the instructions are supplied to the data and instruction registers 72 and 73 through the gates 70 and 71. The automatic assembly apparatus is actuated by the outputs of the registers 72 and 73 for positioning and bonding of the bonding machine 18 in FIG. 2.

Although the above description relates to only the first group in FIG. 3, it is applicable to other groups therein, where the operation of each group is shifted in time such as wave forms $S_8$, $S_9$, and $S_{10}$ in FIG. 6. Therefore, the computer operates during the fly-back period of the respective groups, as shown by a wave form $S_{11}$ in FIG. 6.

More specifically, assuming that the interruption signals shown by waveforms $S_{12}$ and $S_7$ from one of the automatic assembly apparatus and the visual information processing apparatus of the first group are produced, the interruption signal $S_7$ from the visual information processing apparatus is preferentially delivered to the computer, in which the necessary processing for detection of the bonding positions $P_1$ and $P_2$ of the transistor chip is performed during the fly-back period immediately thereafter.

On the other hand, the interruption signal $S_{12}$ from one of the assembly apparatus is temporarily stored in a register and is then input to the computer at a period that the computer is not used such as indicated by a waveform $S_{13}$. In this period, the computer detects whether the visual information processing apparatus coupled with this assembly apparatus is busy, at which period the pattern recognition is not possible and outputs the data of the previously stored bonding positions and the instructions to the automatic assembly apparatus and so forth.

Figure 10:
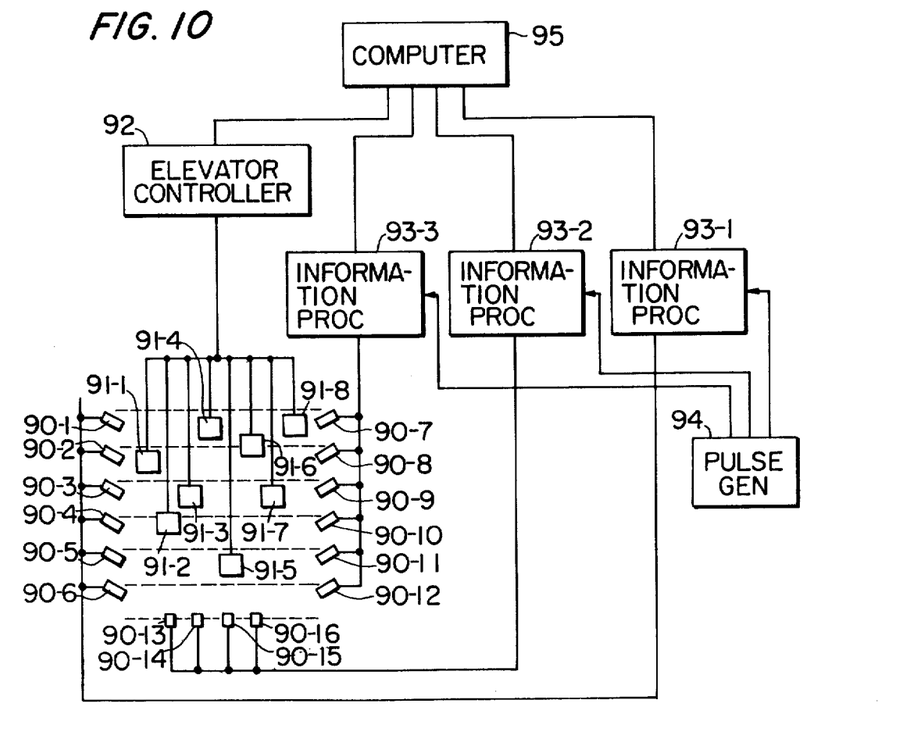
FIG. 10 is a schematic block diagram of a modified embodiment of this invention.

FIG. 10 shows a modified embodiment of the invention applied to an elevator control system. In FIG. 10, reference numerals 90-1 through 90-16 designate image pick-up devices, 91-1 through 91-8 the cages of an elevator system, 92 an elevator control apparatus, 93-1 through 93-3 visual information processing apparatus, 94 a pulse generator and 95 a computer. Dotted lines represent individual floors of a building. The image pick-up devices are grouped to 3 groups i.e. a first group 90-1 through 90-6, a second group 90-7 through 90-12, and a third group 90-13 through 90-16. The first and second groups include the image pick-up devices arranged on the respective floors, respectively and the third group includes the image pick-up devices arranged on a specific floor such as the lobby floor where many people get on and off the cages of the elevator.

Now, the three groups of the image pick-up devices are coupled to the computer 95 through the visual information processing apparatus 93-1 through 93-3, respectively, which are actuated by the timing pulses from the pulse generator 94, each timing pulse being different from each other by T/3 where T is one frame period, the sum of a fly-back period and an effective frame period. The pulse generator 94 can be constructed as same as that shown in FIG. 5. The visual information processing apparatus 93-1 to 93-3 is utilized to supply data to the computer 95 in this case, the data relating to congestion or population of people. The computer recognizes the congestion or population of people based on this data and supplies control information to the elevator control apparatus 92. As a result, the elevator control apparatus can deliver the cages of the elevator to necessary floors in response to congestion or population of people. In this case, call buttons installed on the individual floors serve as switches for interruption signals to the computer as in the case of the foregoing transistor assembly. If the computer has the most recent information for congestion of people in the floors to be served, it can decide which cages should be served. If the data of congestion stored in the computer, however, is old, the computer controls the visual information processing apparatus to obtain new information for congestion and can renew the contents thereof, and then it can decide the floors and the cages of the elevator to be served.

In this system, the computer normally operates so that the respective image pick-up devices installed on the individual floors are sequentially switched and previously stored congestion of the people on each floor is renewed by new information.

When the call button is pushed, to produce an interruption signal, the elevator control apparatus can dynamically assign a cage to serve the floor where the button is pushed so that the average time for people to wait for the cage service is kept at a minimum. This makes it possible to provide an effective elevator service, especially when the specific floor such as the lobby floor or hall is crowded, and it is rush hour in the morning and evening.

Figure 11:
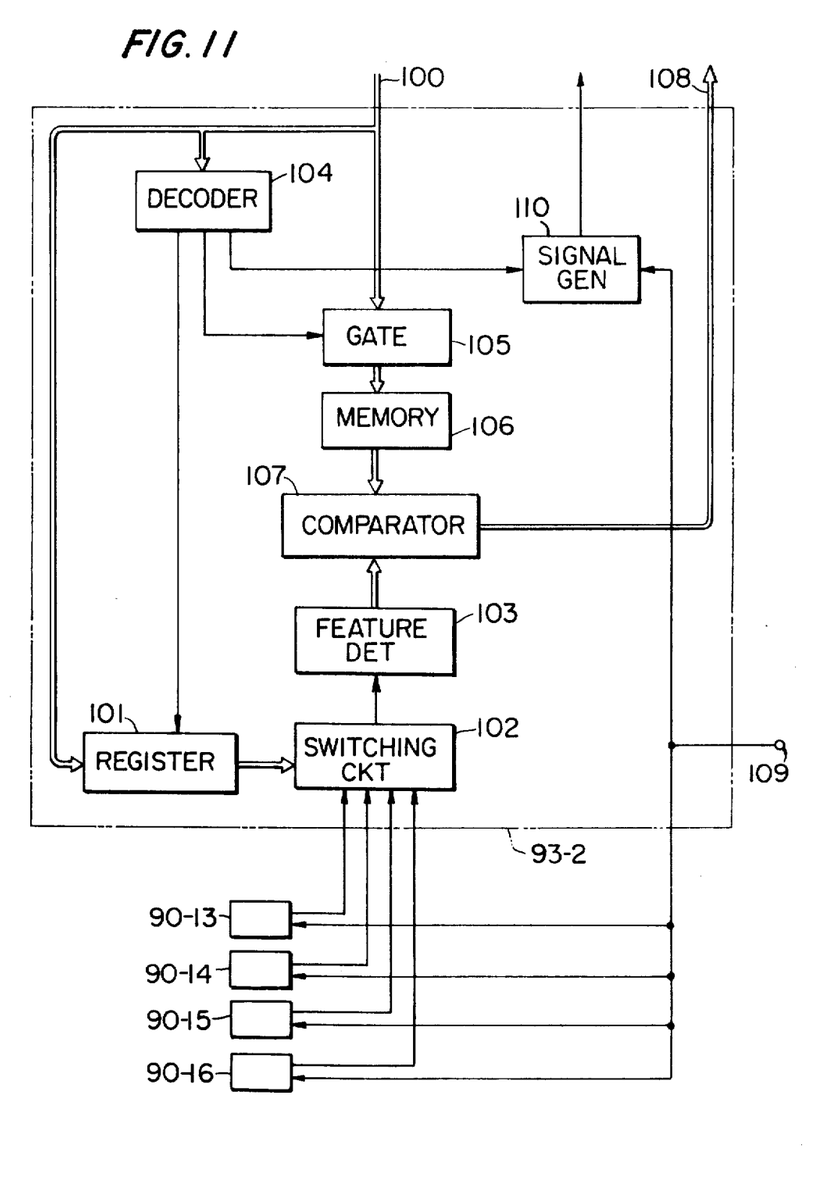
FIG. 11 is a detailed block diagram of the portion of the embodiment shown in FIG. 10.

FIG. 11 shows an embodiment of the visual information processing apparatus i.e. the visual information processing apparatus 93-2. Instructions for selecting one of the image pick-up devices 90-13 through 90-16 are supplied to a register 101 through a digital output bus 100. A switching circuit 102 is controlled by the output of the register 101 in order to deliver to a feature detector 103 the image signal of one of the image pick-up devices 90-13 through 90-16. The feature detector 103 extracts information corresponding to congestion of people. A decoder 104 reads out instructions from the computer through the digital output bus 100, the outputs of the decoder 104 controlling the register 101 and a gate 105. The output of the decoder 104 is further supplied to a signal generator 110 being set by it. This output of the detector 104 is a start signal for the visual information processing apparatus 93-2 and indicates that the apparatus 93-2 is busy.

When the output of the switching circuit 102 is supplied to the feature detector 103, the gate 105 is opened, through which a standard pattern is stored in a memory circuit 106. A comparator 107 compares the contents of the feature detector 103 with the standard pattern in the memory circuit 106. The compared results are supplied to the computer through a digital input bus 108, by which the computer supplies to the elevator controller 92 the information for elevator service.

The standard pattern may be a background information of the image pattern picked up by the image pick-up device or may be previously stored information for congestion of the people. In the former, the congestion or the number of people can be detected as the output of the comparator 107. In the latter, the variation of congestion or of a number of people at that time can be detected. The detailed constructions and descriptions of the feature detector 103, the memory circuit 106 and the comparator 107 are disclosed in U.S. Patent Application Ser. No. 455,420 (German Laid Open Publication 2,414,809). Horizontal and vertical synchronizing pulses are supplied to a terminal 109 in order to actuate the image pick-up devices 90-13 through 90-16. At the same time, a vertical synchronizing signal is supplied to the signal generator 110 the output of which is fed to the computer as the interruption signal as well as the foregoing case of the transistor assembly.

As can be appreciated from the above embodiments, the respective visual information processing apparatus coupled to the plurality of the groups of the image pick-up devices operate in synchronizing with the respective synchronizing signals of the image pick-up devices and the timing for the operation each group is different from each other. Therefore, an interruption of the computer is produced with a different timing in each group, so that the computer can operate with high efficiency and respond to the requirements of various processings.

While only a few forms of the present invention have been shown and described, many modifications will be apparent to those skilled in the art within the spirit and scope of this invention as set forth in the appended claims.

We claim:

1. A group control system, coupled to a computer which processes information supplied thereto from said system, comprising:

first means for generating plural groups of sequential pulses each of said pulse groups being shifted in time with respect to each other;

plural groups of image pickup devices, coupled to said first means, the image pickup devices in each respective group being responsive to a respective group of sequential pulses generated by said first means, with each image pickup device of a respective group of image pickup devices converting a received image pattern into electrical image signals representative of the received image pattern under the synchronizing control of the pulses in that respective pulse group to which said respective group of image pickup devices is responsive;

a plurality of visual information processors, coupled to said first means and the respective groups of image pickup devices, each visual information processor being responsive to a respective group of sequential pulses generated by said first means and extracting predetermined feature information of the image patterns represented by the electrical image signals generated by the image pickup devices of that respective group of image pickup devices to which said each visual information processor is coupled, under the synchronizing control of the pulses in that respective pulse group to which said that respective group of image pickup devices is responsive; and second means, coupled to said visual information processor and said computer, for supplying feature information extracted by said visual information processors to said computer.

2. A group control system according to claim 1, wherein each visual information processor comprises third means, coupled to each of the image pickup devices in that respective group of image pickup devices to which said visual information processor is coupled, for selecting the electrical image signals generated by an individual one of the image pickup devices in said that respective group of image pickup devices to which said visual information processor is coupled, and fourth means, coupled to said second means and to said third means, for extracting feature information from the electrical image signals selected by said third means.

3. A group control system according to claim 1, wherein said first means comprises first generating means for generating a horizontal synchronizing signal to be applied to the image pickup devices of each group of image pickup devices, and second generating means, responsive to the horizontal synchronizing signal generated by said first generating means and being coupled to said image pickup devices and said visual information processors, for generating plural vertical synchronizing signals shifted in time with respect to each other, and supplying said plural vertical synchronizing signals to respective groups of image pickup devices and respective visual information processors.

4. A group control system according to claim 1, which further includes at least one controlled device coupled with said computer, the controlled device being controlled by instruction information supplied from said computer.

5. A group control system according to claim 4, wherein said at least one controlled device comprises a plurality of automatic assembly apparatus for assembling an object, each assembly apparatus being controlled in accordance with the electrical image signals generated by a respective image pickup device.

6. A group control system according to claim 5, wherein each visual information processor comprises selection means, coupled to each of the image pickup devices in that respective group of image pickup devices to which said visual information processor is coupled, for selecting electrical image signals generated by an individual one of the image pickup devices in said that respective groups of image pickup devices to which said visual information processor is coupled, and detection means, coupled to said second means and said selection means, for extracting feature information representative of the position of a specific partial image pattern contained within the image pattern represented by the electrical image signals selected by said selection means.

7. A group control system according to claim 6, in which said detection means comprises first memory means, coupled to said selection means, for extracting partial image signals from the electrical image signals selected by said selection means, second memory means for storing reference image signals representative of a specific partial image pattern, first detecting means, coupled to said first and second memory means, for detecting which of the partial image signals extracted by said first memory means has the highest degree of coincidence with the reference image signals stored in said second memory means, and second detecting means, coupled to said first detecting means, for detecting the position of that specific partial image pattern represented by the partial image signals detected by said first detecting means to have said highest degree of coincidence.

8. A group control system according to claim 5, wherein each automatic assembly apparatus and visual information processor includes means for generating interruption signals, and wherein said second means includes holding means, coupled to said visual information processors and said plurality of automatic assembly apparatus, for storing interruption signals from said visual information processors and said automatic assembly apparatus, and supplying means, coupled to said holding means and said computer, for supplying interruption signals stored in said holding means to said computer.

9. A group control system according to claim 4, in which said controlled device comprises an elevator controller for delivering the cages of an elevator to necessary floors.

10. A group control system according to claim 9, wherein each visual information processor comprises selection means, coupled to each of the image pickup devices in that respective group of image pickup devices to which said visual information processor is coupled, for selecting electrical image signals generated by an individual one of the image pickup devices in said that respective group of image pickup devices to which said visual information processor is coupled, and detection means, coupled to said second means and said selection means, for extracting feature information of the image pattern represented by the electrical image signals selected by said selection means.

* * * * *